(12) United States Patent
Park et al.

(10) Patent No.: US 12,461,606 B2
(45) Date of Patent: Nov. 4, 2025

(54) OPTICAL PEN AND DISPLAY SYSTEM INCLUDING OPTICAL INTERFACE

(71) Applicant: SAMSUNG DISPLAY CO., LTD., Yongin-si (KR)

(72) Inventors: Gil Yeong Park, Yongin-si (KR); Hee Young Lee, Yongin-si (KR); Da Som Gu, Yongin-si (KR); Ki Jun Roh, Yongin-si (KR); Sung Guk An, Yongin-si (KR); So Yeon Han, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 36 days.

(21) Appl. No.: 18/528,958

(22) Filed: Dec. 5, 2023

(65) Prior Publication Data

US 2024/0402837 A1 Dec. 5, 2024

(30) Foreign Application Priority Data

May 30, 2023 (KR) .......................... 10-2023-0069442

(51) Int. Cl.
*G06F 3/0354* (2013.01)
(52) U.S. Cl.
CPC ...... *G06F 3/03542* (2013.01); *G06F 3/03545* (2013.01)

(58) Field of Classification Search
None
See application file for complete search history.

(56) References Cited

U.S. PATENT DOCUMENTS

2017/0068342 A1* 3/2017 Zimmerman ....... G06F 3/03545
2023/0384873 A1* 11/2023 Kim ..................... G06F 3/0321

FOREIGN PATENT DOCUMENTS

| CN | 114967947 | 8/2022 |
| KR | 10-1387005 | 4/2014 |
| KR | 10-2022-0013128 | 2/2022 |
| KR | 10-2386276 | 4/2022 |

* cited by examiner

*Primary Examiner* — Ifedayo B Iluyomade
(74) *Attorney, Agent, or Firm* — F. CHAU & ASSOCIATES, LLC

(57) ABSTRACT

A display system includes an optical interface. The display system includes an optical pen outputting infrared light. A display device acquires information on a user input based on the infrared light provided by the optical pen. The display device includes a panel layer and a code layer disposed on the panel layer. The code layer includes an optical pattern absorbing at least a portion of the infrared light provided by the optical pen. The optical pen includes a pen body and a nib disposed in the pen body. The nib includes a nib head part including a first end portion and an opposite second end portion. A nib body part is connected to the nib head part. The first end portion forms a curved surface.

19 Claims, 9 Drawing Sheets

CDD: EMT, RCV

OPTICAL PEN AND DISPLAY SYSTEM INCLUDING OPTICAL INTERFACE

CROSS-REFERENCE TO RELATED APPLICATION

This application claims priority under 35 U.S.C. § 119 to Korean Patent Application No. 10-2023-0069442, filed on May 30, 2023 in the Korean Intellectual Property Office, the disclosure of which is incorporated by reference in its entirety herein.

1. Technical Field

The present disclosure generally relates to an optical pen and a display system including an optical interface.

2. Discussion of Related Art

Display devices which generate images to provide visual information to a user have become increasingly important with the development of information technologies. Display devices have recently been developed to support a touch input using a touch pen.

As a display device senses a touch input using a touch pen, the display device can sense the touch input more accurately than when a touch input using a body part is implemented.

The display device should be manufactured so that a panel of the display device does not need to be excessively pressed when the display device is in contact with the touch pen. Also, the touch pen should be manufactured so that it does not excessively press the panel of the display device when the touch pen is in contact with the display device.

SUMMARY

Embodiments of the present disclosure provide an optical pen and a display system including an optical interface which prevents a display device from being excessively pressed when the display device is in contact with the optical pen, and can provide a soft writing feeling to a user.

According to an embodiment of the present disclosure, a display system includes an optical interface. The display system includes an optical pen outputting infrared light. A display device acquires information on a user input based on the infrared light provided by the optical pen. The display device includes a panel layer and a code layer disposed on the panel layer. The code layer includes an optical pattern absorbing at least a portion of the infrared light provided by the optical pen. The optical pen includes a pen body and a nib disposed in the pen body. The nib includes a nib head part including a first end portion and an opposite second end portion. A nib body part is connected to the nib head part. The first end portion forms a curved surface.

In an embodiment, the nib head part may include felt or synthetic fiber.

In an embodiment, the curved surface of the first end portion may have a curvature radius in a range of about 0.5 mm to about 5 mm.

In an embodiment, a hardness of the nib may be in a range of about 50 to about 90 with respect to Shore A hardness.

In an embodiment, the display device may further include at least one of a polarizing layer disposed on the panel layer and a window layer disposed on the code layer. The window layer has a thickness in a range of about 20 µm to about 100 µm.

In an embodiment, the display device may be a foldable, slidable or rollable display device.

In an embodiment, the nib head part may have a first width in a range of about 1.1 mm to about 1.5 mm. The nib body part may have a second width in a range of about 0.7 mm to about 1.1 mm.

In an embodiment, the nib head part may include an elastic polymer including at least one elastomer selected from the group consisting of rubber, silicone, urethane, and urethane acrylate.

In an embodiment, the display device may further include a film layer disposed on the code layer. The film layer may include a protrusion part protruding from at least a portion of a first surface of the film layer.

In an embodiment, the nib head part may include plastic including at least one material selected from the group consisting of polyethylene terephthalate, high density polyethylene, low density polyethylene, polypropylene, polystyrene, and polyvinyl chloride.

In an embodiment, the optical pen may further include a spring in contact with the nib body part disposed in the pen body. The spring may be at least one of a compression spring, a tension spring, and a leaf spring.

According to an embodiment of the present disclosure, an optical pen includes a pen body and a nib disposed in the pen body. The nib includes a nib head part including a first end portion and an opposite second end portion. A nib body part is connected to the nib head part. The first end portion forms a curved surface. The second end portion has a first width and the nib body part has a second width. The nib includes felt or synthetic fabric. A hardness of the nib is in a range of about 50 to about 90 with respect to Shore A hardness. In an embodiment, the first width may be in a range of about 1.1 mm to about 1.5 mm. The second width may be less than the first width.

According to an embodiment of the present disclosure, an optical pen includes a pen body and a nib disposed in the pen body. The nib includes a nib head part including a first end portion and an opposite second end portion. A nib body part is connected to the nib head part. The first end portion includes a curved surface. The nib includes a first material having a hardness in a range of about 50 with respect to Shore A hardness to a hardness of about 40 with respect to Shore D hardness at the first end portion. The nib includes a second material different from the first material at the second end portion.

In an embodiment, the first material may include felt or synthetic fiber, and the second material may include plastic or an elastomer.

In an embodiment, the curved surface of the first end portion has a curvature radius in a range of about 0.5 mm to about 5 mm.

In an embodiment, the nib head part has a first width in a range of about 1.1 mm to about 1.5 mm and the nib body part has a second width that is less than the first width.

DETAILED DESCRIPTION OF EMBODIMENTS

Figure 1:
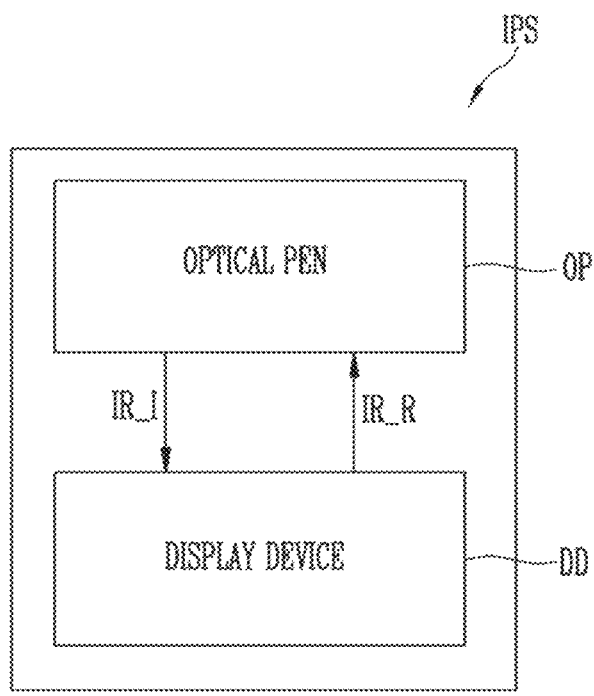
FIG. 1 is a schematic block diagram illustrating a display device including an optical input interface in accordance with an embodiment of the present disclosure.

The present disclosure may apply various changes and different shapes. Therefore, embodiments of the present disclosure are not necessarily limited to the examples shown in the drawings and shall include equivalents. The drawings may be illustrated so that elements are expanded for ease of understanding.

It will be understood that, although the terms "first", "second", etc. may be used herein to describe various elements, these elements should not be limited by these terms. These terms are only used to distinguish one element from another element. Thus, a "first" element discussed below could also be termed a "second" element without departing from the teachings of the disclosure. As used herein, the singular forms are intended to include the plural forms as well, unless the context clearly indicates otherwise.

It will be further understood that the terms "includes" and/or "including", when used in this specification, specify the presence of stated features, integers, steps, operations, elements, and/or components, but do not preclude the presence and/or addition of one or more other features, integers, steps, operations, elements, components, and/or groups thereof. Further, an expression that an element such as a layer, region, substrate or plate is placed "on" or "above" another element indicates not only an embodiment in which the element is placed "directly on" or "just above" the other element but also an embodiment in which a further element is interposed between the element and the other element. An expression that an element such as a layer, region, substrate or plate is placed "beneath" or "below" another element indicates not only an embodiment in which the element is placed "directly beneath" or "just below" the other element but also an embodiment in which a further element is interposed between the element and the other element.

The present disclosure generally relates to an optical pen and a display system including an optical interface. Hereinafter, an optical pen and a display system including an optical interface in accordance with an embodiment of the present disclosure will be described with reference to the accompanying drawings.

Figure 2:
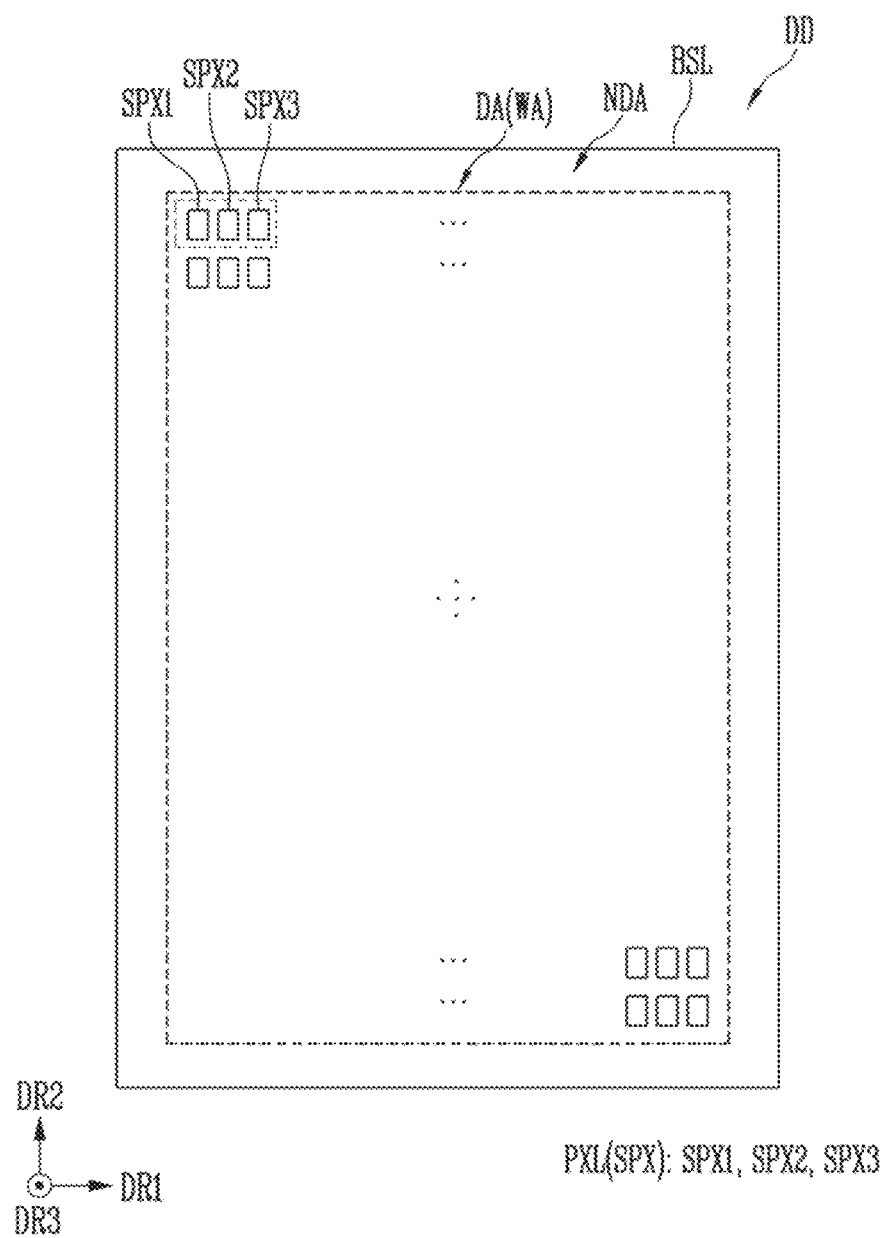
FIG. 2 is a schematic plan view illustrating a display device in accordance with an embodiment of the present disclosure.

FIG. 1 is a schematic block diagram illustrating a display device including an optical input interface in accordance with an embodiment of the present disclosure. FIG. 2 is a schematic plan view illustrating a display device in accordance with an embodiment of the present disclosure.

A display device including an optical input interface to which an optical pen can be applied will be described with reference to FIGS. 1 and 2.

Referring to FIGS. 1 and 2, a display system IPS in accordance with an embodiment of the present disclosure may include an optical input interface. For example, in an embodiment the display system IPS may include a system in which a display device DD acquires information on a user input based on optical information provided by an optical pen OP.

The display system IPS may include the optical pen OP and the display device DD. The optical pen OP and the display device DD are configured to interact with each other.

A user may input various information, such as a text, an image, and the like, to a writing area WA of the display device DD by using the optical pen OP.

The optical pen OP is configured to output light. The optical pen OP may be configured to output first infrared light IR_I including information on a user input. For example, in an embodiment the user may perform an operation for inputting a text, an image or the like on the writing area WA of the display device DD by using the optical pen OP, and the first infrared light IR_I may be applied to a partial position in the writing area WA according to the operation performed by the user. The first infrared light IR_I includes information on an input operation of the user.

The optical pen OP is configured to receive light provided (e.g., reflected) from the display device DD. The optical pen OP may be configured to receive the reflected light from the display device DD as a second infrared light IR_R including the information on the user input.

Infrared light may be light in a wavelength band of 750 nm or more. For example, in some embodiments, the infrared light may be light having a wavelength in a range of 750 nm to 950 nm. In some embodiments, a peak wavelength of the infrared light may be included in a range of 750 nm to 950 nm.

For example, in an embodiment the first infrared light IR_I may be selectively reflected according to a position in the writing area WA by a code layer CODE (see FIG. 5) including an optical pattern OPP (see FIG. 5) included in the display device DD. The reflected second infrared light IR_R may be differently defined according to a position input by the user, and the optical pen OP may recognize the second infrared light IR_R, thereby acquiring information on an input position on the writing area WA.

Accordingly, information on a user input may be calculated based on the information on the input position on the writing area WA. In some embodiments, the display device DD may acquire (e.g., calculate) the information on the user input. In some embodiments, the optical pen OP may acquire (e.g., calculate) the information on the user input.

The display device DD is configured to emit light. The display device DD is a device which displays at least one moving image and/or still image, and may be used as a display screen of not only portable electronic devices such as a mobile phone, a smart phone, a tablet personal computer (PC), a mobile communication terminal, an electronic notebook, an electronic book, a portable multimedia player (PMP), a navigation system, and an ultra-mobile PC, but also various other electronic products such as a television, a notebook computer, a monitor, an advertisement board, and Internet of things (IoT).

In an embodiment, the display device DD may be formed in a rectangular plane having relatively short sides in a first direction DR1 and relatively long sides in a second direction DR2 intersecting the first direction DR1. In an embodiment, a corner at which the relatively short side in the first direction DR1 and the relatively long side in the second direction DR2 meet each other may have a round shape having a predetermined curvature or be formed at a right angle. However, embodiments of the present disclosure are not necessarily limited thereto and the planar shape of the display device DD may vary from a quadrangular shape. For example, the display device DD may be formed in another polygonal shape, a circular shape, or an elliptical shape. The display device DD may be formed flat. However, embodiments of the present disclosure are not necessarily limited thereto. For example, the display device DD may include a curved part which is formed at a left/right end and has a constant curvature or a changing curvature. In addition, in an embodiment the display device DD may be formed to be flexible, such as to be warpable, curvable, bendable, foldable or rollable. Accordingly, the display device DD may be a foldable, slidable or rollable display device.

The display device DD may include a base layer BSL and pixels PX arranged on the base layer BSL. The display device DD may further include a driving circuit (e.g., a scan driver and a data driver) for driving the pixels PX, lines, and pads.

The display device DD may include a display area DA and a non-display area NDA. The non-display area NDA may mean all areas except for the display area DA. In an embodiment, the non-display area NDA may surround at least a portion of the display area DA (e.g., in the first and/or second directions DR2). The display device DD may further include the writing area WA. In some embodiments, the non-display area NDA may surround at least a portion of the writing area WA (e.g., in the first and/or second directions DR2). For example, as shown in an embodiment of FIG. 2, the non-display area NDA may fully surround the writing area WA in the first and section directions DR1, DR2

The base layer BSL may form a base member of the display device DD. The base layer BSL may be a rigid or flexible substrate or film. For example, in an embodiment, the base layer BSL may be a rigid substrate made of glass or tempered glass, a flexible substrate (e.g., a thin film) made of plastic or a metal material, or at least one insulating layer. However, the material and/or property of the base layer BSL is not necessarily limited thereto. In some embodiments, the base layer BSL may be substantially transparent. The term "substantially transparent" may mean that light can be transmitted with a predetermined transmittance or more. In some embodiments, the base layer BSL may be translucent or opaque. Also, the base layer BSL may include a reflective material in some embodiments.

The display area DA may mean an area in which the pixels PX are disposed. The non-display area NDA may mean an area in which the pixels PXL are not disposed. In an embodiment, the driving circuit, the lines, and the pads, which are connected to the pixels PX of the display area DA, may be disposed in the non-display area NDA.

The writing area WA may be an area capable of receiving the first infrared light IR_I provided by the optical pen OP. For example, the writing area WA may be an area in which the optical pattern OPP (FIG. 5) is disposed.

The display area DA may at least overlap with the writing area WA in a plan view. For example, in an embodiment the display area DA and the writing area WA may entirely overlap with each other in a plan view. However, embodiments of the present disclosure are not necessarily limited thereto and the display area DA and the writing area WA may partially overlap with each other in a plan view in some embodiments.

In some embodiments, the pixels PX (e.g., sub-pixels SPX in FIG. 2) may be arranged according to a stripe arrangement structure, a PENTILE™ arrangement structure, or the like. However, embodiments of the present disclosure are not necessarily limited thereto In some embodiments, the pixel PX includes a light emitting element LD. In an embodiment, the pixel PX (e.g., the sub-pixels SPX in FIG. 2) may include a first sub-pixel SPX1, a second sub-pixel SPX2, and a third sub-pixel SPX3. However, embodiments of the present disclosure are not necessarily limited thereto and the number of the sub-pixels may vary. At least one first sub-pixel SPX1, at least one second sub-pixel SPX2, and at least one third sub-pixel SPX3 may constitute one pixel unit capable of emitting lights of various colors.

For example, each of the first sub-pixel SPX1, the second sub-pixel SPX2, and the third sub-pixel SPX3 may emit light of one color. For example, in an embodiment the first sub-pixel SPX1 may be a red pixel emitting light of red (e.g., a first color), the second sub-pixel SPX2 may be a green pixel emitting light of green (e.g., a second color), and the third sub-pixel SPX3 may be a blue pixel emitting light of blue (e.g., a third color). However, the color, kind, and/or number of the first, second, and third sub-pixels SPX1, SPX2, and SPX3 constituting each pixel unit are not necessarily limited thereto and may vary.

Figure 3:
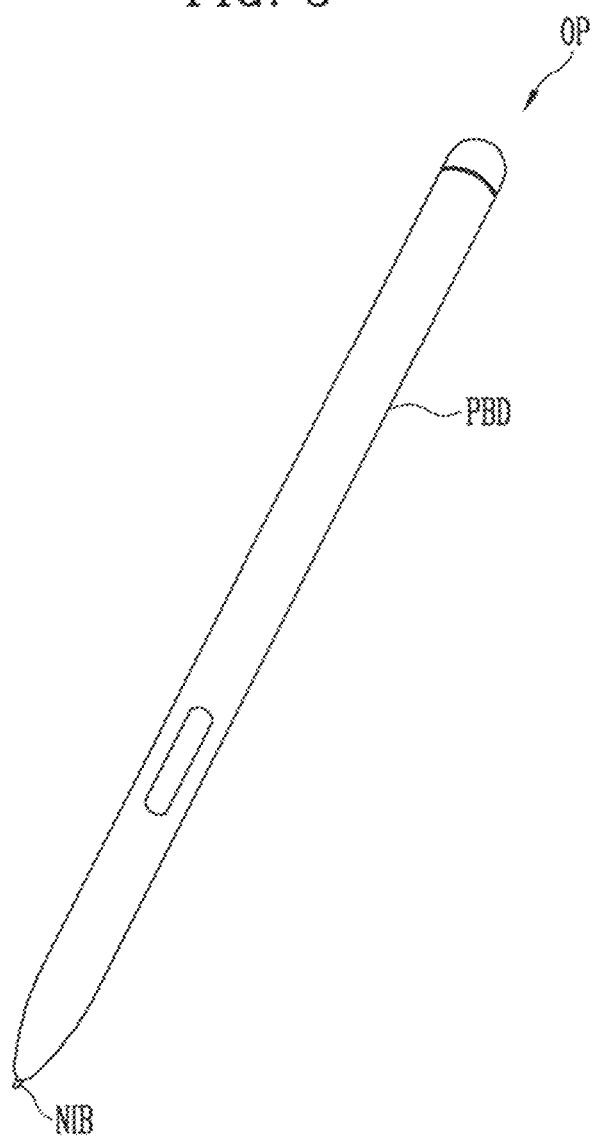
FIGS. 3 and 4 are schematic views illustrating an optical pen in accordance with embodiments of the present disclosure.
Figure 4:
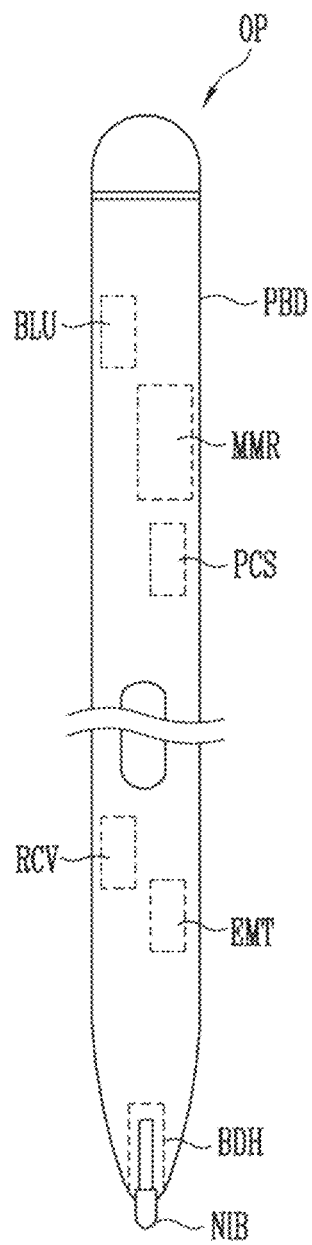

FIGS. 3 and 4 are schematic views illustrating an optical pen in accordance with an embodiment of the present disclosure. Hereinafter, an optical pen OP capable of providing optical information to the display device DD will be described with reference to FIGS. 3 and 4.

The optical pen OP may include a nib NIB and a pen body PBD in which the nib NIB can be disposed (e.g., inserted). The pen body PBD may include a hole BDH into which the nib NIB can be inserted at one end portion thereof. In some embodiments, the pen body PBD may include a housing in which an internal configuration of the optical pen OP can be accommodated. In an embodiment, the optical pen OP may have a writing instrument shape (e.g., a fountain pen shape, or the like). However, embodiments of the present disclosure are not necessarily limited thereto.

In an embodiment as shown in FIG. 4, the optical pen OP may include a code detector CDD, a code processor PCS, a communication part BLU, and a memory MMR.

The code detector CDD may be configured to interact with an optical pattern OPP of a code layer CODE so as to acquire optical information based on a structure of the optical pattern OPP. For example, in an embodiment the code detector CDD may include a light emitting part EMT which releases first infrared light IR_I and a light receiving part RCV which detects second infrared light IR_R reflected from the optical pattern OPP by using an infrared camera.

The code detector CDD may continuously detect optical patterns OPP included in at least some areas of the code layer CODE according to control and motion of a user. The code detector CDD may generate (e.g., continuously generate) data corresponding to position information of the detected optical patterns OPP and provide the generated data to the code processor PCS.

The code processor PCS may receive (e.g., continuously receive) the data corresponding to the optical patterns OPP from the code detector CDD. For example, the code processor PCS may continuously receive the data about the optical patterns OPP from the code detector CDD and identify a structure and a shape of the optical patterns OPP. The code processor PCS may extract or generate a data code corresponding to the structure and the shape of the optical patterns OPP, and combine the data code, thereby extracting or generating coordinate data corresponding to the combined data code. The code processor PCS may transmit the generated coordinate data to the display device DD through the communication part BLU.

The communication part BLU may perform wired/wireless communication with an external device (e.g., the display device DD). For example, the communication unit BLU may transmit/receive a communication signal to/from the display device DD. The communication unit BLU may receive coordinate data configured with a data code from the code processor PCS, and provide the coordinate data to the display device DD.

The memory MMR may store data necessary for the driving of the optical pen OP. In an embodiment, the memory MMR may store data codes of optical patterns OPP. The memory MMR may store coordinate data according to data codes and combinations of the data codes.

Figure 5:
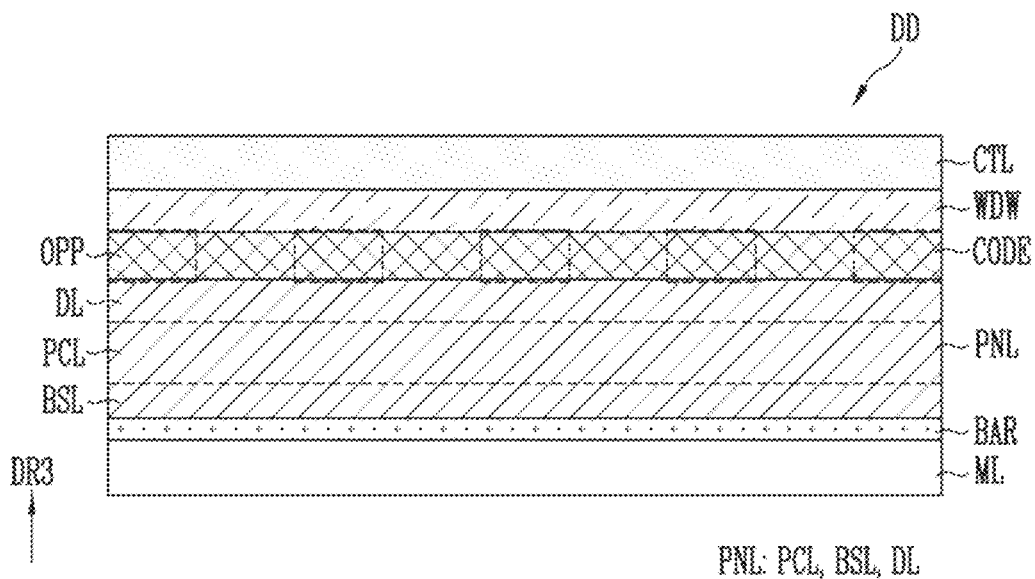
FIG. 5 is a cross-sectional view illustrating a schematic stacked structure of a display device in accordance with an embodiment of the present disclosure, among display devices which may be included in a display system.

FIG. 5 is a view illustrating a schematic stacked structure of a display device in accordance with an embodiment of the present disclosure, among display devices which may be included in the display system. Hereinafter, a structure of the display device DD in accordance with an embodiment of the present disclosure will be described with reference to FIG. 5.

Referring to FIG. 5, the display device DD in accordance with the first embodiment of the present disclosure may include a metal layer ML, a barrier layer BAR, a panel layer PNL, a code layer CODE, a window layer WDW, and a coating layer CTL consecutively stacked in the third direction DR3 which crosses the first and second directions DR1, DR2.

The metal layer ML may support components of the display device DD, which are stacked on the top of the metal layer ML.

The metal layer ML may include a metal material. In some embodiments, the metal material may include at least one compound selected from the group consisting of molybdenum (Mo), aluminum (Al), chromium (Cr), gold (Au), titanium (Ti), nickel (Ni), neodymium (Nd), and copper (Cu).

In an embodiment, the metal layer ML may prevent a foreign substance or the like from infiltrating into layers to be stacked on the top of the metal layer ML. The metal layer ML may also support the components of the display device DD. In some embodiments, the metal layer ML may further perform at least one function among a heating function, a grounding function, a buffering function, a strength reinforcing function, an adhering function, and an input sensing function. However, embodiments of the present disclosure are not necessarily limited thereto.

The barrier layer BAR may be disposed on the metal layer ML (e.g., the third direction DR3). The barrier layer BAR may be a layer which prevents or reduces infiltration of an external foreign substance. The barrier layer BAR may include an organic material or an inorganic material.

In some embodiments, the organic material may include at least one material selected from the group consisting of acrylic resin, epoxy resin, phenolic resin, polyamide resin, polyimide resin, polyester resin, polyphenylenesulfide resin, and benzocyclobutene. However, embodiments of the present disclosure are not necessarily limited thereto.

In some embodiments, the inorganic material may include at least one compound selected from the group consisting of silicon nitride ($SiN_x$), aluminum nitride ($AlN_x$), titanium nitride ($TiN_x$), silicon oxide ($SiO_x$), aluminum oxide ($AlO_x$), titanium oxide ($TiO_x$), silicon oxycarbide ($SiO_xC_y$), and silicon oxynitride ($SiO_xN_y$). However, embodiments of the present disclosure are not necessarily limited thereto.

The panel layer PNL may be disposed on the barrier layer BAR (e.g., in the third direction DR3). In an embodiment, the panel layer PNL may include a base layer BSL, a pixel circuit layer PCL, and a display layer DL (e.g., consecutively stacked in the third direction DR3).

The pixel circuit layer PCL may be disposed on the base layer BSL (e.g., in the third direction DR3). The pixel circuit layer PCL may be a layer including a pixel circuit for driving a pixel PX. In an embodiment, the pixel circuit layer PCL may include the base layer BSL, conductive layers for forming pixel circuits, and insulating layers disposed between the conductive layers. In some embodiments, the pixel circuit layer PCL may include a thin film transistor, and may be electrically connected to a pixel PXL (e.g., a sub-pixel SPX) to apply a driving signal.

The display layer DL may be disposed on the pixel circuit layer PCL (e.g., in the third direction DR3). The display layer DL is configured to emit light. The display layer DL may be provided in various forms. For example, in an embodiment the display layer DL may include an inorganic light emitting element including an inorganic material. However, embodiments of the present disclosure are not necessarily limited thereto. For example, in some embodiments, the display layer DL may include an Organic Light Emitting Diode (OLED).

The code layer CODE may be disposed on the panel layer PNL (e.g., in the third direction DR3). The code layer CODE may include an optical pattern OPP.

In an embodiment, the optical pattern OPP may be arranged as a dot pattern. The optical pattern OPP may be provided in plurality, and may be patterned according to various arrangement structures.

The optical pattern OPP may be configured to absorb at least a portion of infrared light. For example, in an embodiment the optical pattern OPP may absorb at least a portion of the first infrared light IR_I applied by the optical pen OP.

An intensity of the second infrared light IR_R reflected by the display device DD in an area in which the optical pattern OPP is disposed may be different from an intensity of the second infrared light IR_R reflected by the display device DD in an area in which the optical pattern OPP is not disposed. Information on data which the optical pen OP provides to the writing area WA may be acquired based on optical information for each position, and input information input by a user may be acquired based on the acquired information.

The optical pattern OPP may include a material that absorbs light in an infrared wavelength band. In some embodiments, the optical pattern OPP may include various organic materials capable of absorbing light in a wavelength band in a range of about 750 nm to about 950 nm (e.g., light in at least a portion of the wavelength band in the range of 750 nm to 950 nm). However, embodiments of the present disclosure are not necessarily limited thereto.

The display device DD in accordance with an embodiment includes the code layer CODE including the optical pattern OPP and the display system IPS includes the optical pen OP.

In a comparative embodiment in which a pen capable of interacting with a display is a pen driven using an electromagnetic method, a digitizer may be included in a stacked structure of the display. The digitizer may include a circuit for converting a movement of an instrument such as a pen in an IT device into a digital signal, and the like. Since the digitizer includes the circuit and the like, the digitizer may have a relatively high weight, a large thickness, and relatively high cost in manufacturing may be incurred as compared with the display device not including the digitizer.

The display system ISP in accordance with an embodiment of the present disclosure includes the optical pen OP, and hence the display device DD does not include the digitizer. Thus, the display device DD can have a relatively light weight, a relatively small thickness, and a relatively low cost in manufacturing can be incurred as compared with the display including the digitizer.

The window layer WDW may be disposed on the code layer CODE (e.g., in the third direction DR3). The window layer WDW is a protective member disposed at an outer portion of the display device DD, and may be a layer including a substantially transparent transmissive member.

In some embodiment, the window layer WDW may include at least one of glass, plastic film, and ultra thin glass (UTG™). In some embodiments, a thickness of the window layer WDW in a third direction DR3 may be in a range of about 20 μm to about 100 μm. However, embodiments of the present disclosure are not necessarily limited thereto.

In an embodiment in which the display device DD includes the window layer WDW, the display device DD may have a relatively high modulus as compared with an embodiment in which the window layer WDW is not included. As the display device DD has a higher modulus, the pressing of a component (e.g., the coating layer CTL) of the display device DD in direct contact with the optical pen OP can be decreased when the optical pen OP is in direct contact with the display device DD. As the pressing (e.g., pressure applied by the optical pen OP) of the display device DD due to the optical pen OP is decreased, the optical pen OP can be softly slid across the writing area WA by the user for input. As the optical pen OP is softly slid, the optical pen OP can provide a soft writing feeling to the user.

The coating layer CTL may be disposed on the window layer WDW (e.g., in the third direction DR3). The coating layer CTL may be coated on one surface of the display device DD. In some embodiments, the coating layer CTL may be at least one of an anti-scattering coating layer, a strength reinforcing coating layer, an anti-fingerprint (AF) coating layer, an anti-glare (AG) coating layer, an anti-reflection (AR) coating layer, and a low-refraction (LR) coating layer. However, embodiments of the present disclosure are not necessarily limited thereto.

In an embodiment, an adhesive layer may be disposed between the respective layers. For example, the adhesive layer may be disposed between the metal layer ML and the barrier layer BAR (e.g., in the third direction DR3). The adhesive layer may be disposed between the barrier layer BAR and the panel layer PNL (e.g., in the third direction DR3). The adhesive layer may be disposed between the panel layer PNL and the code layer CODE (e.g., in the third direction DR3), between the code layer CODE and the window layer WDW (e.g., in the third direction DR3), and between the window layer WDW and the coating layer CTL (e.g., in the third direction DR3).

The adhesive layer may include a material having flexibility. In some embodiments, the material having flexibility may include at least one material selected from the group consisting of polyimide, polyethylene terephthalate, and polyethylene naphthalate. As the adhesive layer includes the material having flexibility, the flexibility of the display device DD may increase as a larger number of adhesive layers are disposed. When the flexibility of the display device DD increases, the display device DD may have a structure suitable for a foldable, slidable or rollable display device.

In an embodiment, the adhesive layer may include at least one of a press sensitive adhesive (PSA) and an optical clear adhesive (OCA). However, embodiments of the present disclosure are not necessarily limited thereto.

Figure 6:
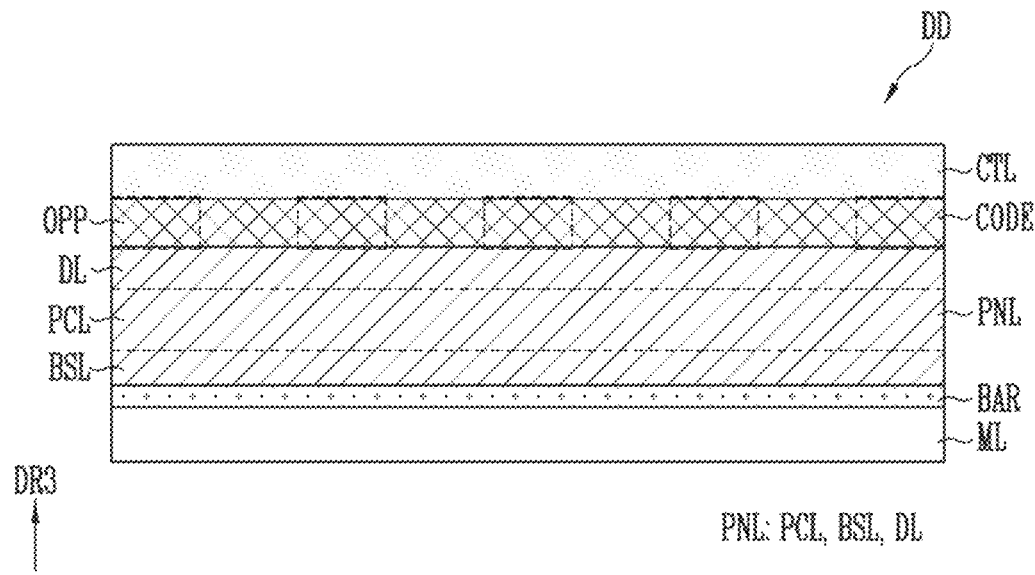
FIG. 6 is a cross-sectional view illustrating a schematic stacked structure of a display device in accordance with an embodiment of the present disclosure, among the display devices which may be included in the display system.

FIG. 6 is a view illustrating a schematic stacked structure of a display device in accordance with an embodiment of the present disclosure, among the display devices which may be included in the display system. Hereinafter, a structure of the display device DD in accordance with an embodiment of the present disclosure will be described with reference to FIG. 6.

The embodiment of the display device DD shown in FIG. 6 is different from an embodiment of the display device DD shown in FIG. 5 based on the display device DD not including the window layer WDW. In FIG. 6, a repeated description of identical or similar elements may be omitted for economy of description.

In some embodiments, the display device DD may not include the window layer WDW. As the display device DD does not include the window layer WDW, the display device DD may have a relatively low modulus as compared with an embodiment in which the window layer WDW is included.

Foldable, slidable, and rollable display devices may include a stacked structure having a relatively low modulus. In an embodiment in which the display device DD has a relatively high modulus, it may be difficult for the display device DD to be foldable, slidable, and rollable.

The display device DD in accordance with an embodiment shown in FIG. 6 may be provided to have a relatively low modulus. Accordingly, the display device DD in accordance with this embodiment can have a structure suitable for a foldable, slidable or rollable display device.

However, in an embodiment in which the display device DD has a relatively low modulus, there is a risk that the pressing (e.g., the pressure applied thereon) of the display device will increase when a user applies an input to the display device DD by using an input instrument such as a pen, and a satisfactory writing feeling may not be provided to the user.

When the display device DD is in direct contact with a pen, a nib of the pen may include a material such as rubber having a relatively low hardness so as to decrease the pressing of (e.g., the pressure applied thereon) the display device DD. However, in an embodiment in which the nib includes the material such as rubber, friction excessively occurs when the nib directly contacts the display device DD, and therefore, it may be difficult to provide a soft writing feeling to the user. In contrast, when the pen includes a material such as plastic having a relatively high hardness, the pressing of the display device DD (e.g., the pressure applied thereon) may increase when the pen directly contacts the display device DD.

Accordingly, a structure of a pen is required, which can provide a soft writing feeling to the user and decrease the pressing of (e.g., the pressure applied thereon) the display device DD. The optical pen OP in accordance with an embodiment of the present disclosure can provide a soft writing feeling to the user and decrease the pressing of (e.g., the pressure applied thereon) the display device DD. This will be described later with reference to the drawings from FIG. 10.

Figure 7:
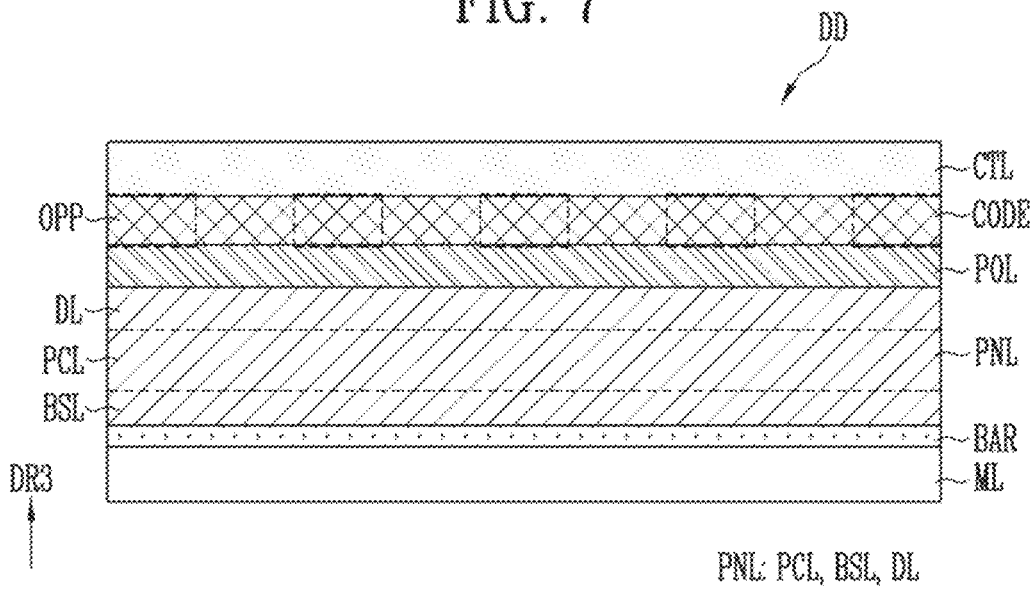
FIG. 7 is a cross-sectional view illustrating a schematic stacked structure of a display device in accordance with an embodiment of the present disclosure, among the display devices which may be included in the display system.

FIG. 7 is a view illustrating a schematic stacked structure of a display device in accordance with an embodiment of the present disclosure, among the display devices which may be included in the display system. Hereinafter, a structure of the display device DD in accordance with an embodiment of the present disclosure will be described with reference to FIG. 7.

An embodiment of the display device DD shown in FIG. 7 is different from an embodiment of the display device DD shown in FIG. 6 based on the display device DD further including a polarizing layer POL.

In an embodiment, the display device DD may include at least one of the polarizing layer POL and the window layer WDW (see FIG. 5).

The polarizing layer POL may be disposed on the panel layer PNL (e.g., in the third direction DR3). The polarizing layer POL may be disposed between the panel layer PNL and the code layer CODE (e.g., in the third direction DR3). The polarizing layer POL may prevent reflection of external light applied to the display device DD.

As the display device DD includes the polarizing layer POL, the display device DD may include a relatively large number of adhesive layers as compared with when the display device DD does not include the polarizing layer POL. Accordingly, the flexibility of the display device DD can increase, and the display device DD in accordance with this embodiment can have a structure suitable for a foldable, slidable or rollable display device.

Figure 8:
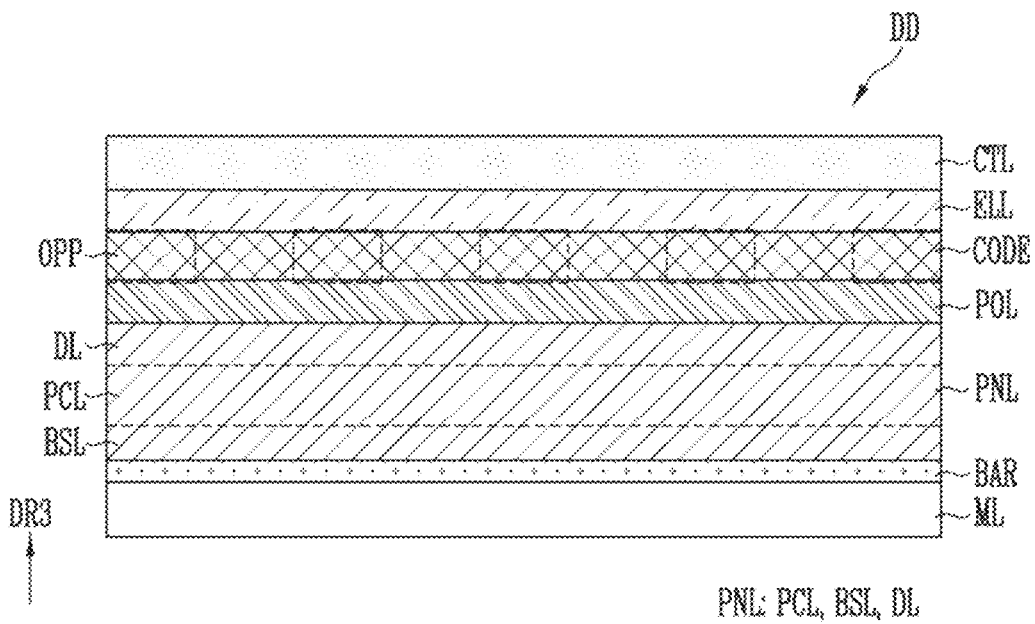
FIG. 8 is a cross-sectional view illustrating a schematic stacked structure of a display device in accordance with an embodiment of the present disclosure, among the display devices which may be included in the display system.

FIG. 8 is a view illustrating a schematic stacked structure of a display device in accordance with an embodiment of the present disclosure, among the display devices which may be included in the display system. Hereinafter, a structure of the display device DD in accordance with an embodiment of the present disclosure will be described with reference to FIG. 8.

An embodiment of the display device DD shown in FIG. 8 is different from an embodiment of the display device DD shown in FIG. 7 based on the display device DD further including a cover layer ELL.

The cover layer ELL may be disposed on the code layer CODE (e.g., in the third direction DR3). The cover layer ELL may be disposed between the code layer CODE and the coating layer CTL (e.g., in the third direction DR3). The cover layer ELL may be disposed at an outer portion of the display device DD to protect the display device DD.

The cover layer ELL may include a material having flexibility. In some embodiments, the cover layer ELL may include at least one material selected from the group consisting of polyimide and polyethylene terephthalate. However, embodiments of the present disclosure are not necessarily limited thereto.

As the cover layer ELL includes the material having flexibility, the flexibility of the display device DD can increase, and the display device DD in accordance with this embodiment can have a structure suitable for a foldable, slidable or rollable display device.

Figure 9:
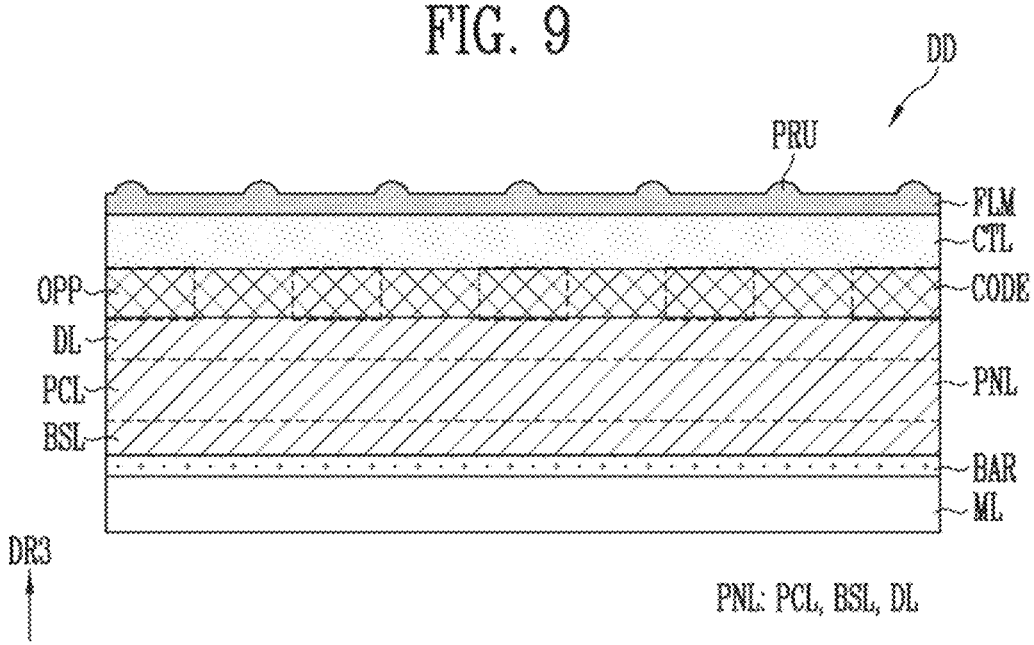
FIG. 9 is a cross-sectional view illustrating a schematic stacked structure of a display device in accordance with an embodiment of the present disclosure, among the display devices which may be included in the display system.

FIG. 9 is a view illustrating a schematic stacked structure of a display device in accordance with an embodiment of the present disclosure, among the display devices which may be included in the display system. Hereinafter, a structure of the display device DD in accordance with an embodiment of the present disclosure will be described with reference to FIG. 9.

An embodiment of the display device DD shown in FIG. 9 is different from the above-described embodiments shown in FIG. 6 based on the display device DD includes a film layer FLM on the coating layer CTL (e.g., in the third direction DR3).

The film layer FLM may be disposed on the coating layer CTL (e.g., in the third direction DR3). In an embodiment, the film layer FLM may be in direct contact with the coating layer CTL. The film layer FLM may be disposed on the code layer CODE.

The film layer FLM may be a layer in direct contact with the optical pen OP. For example, when an input is applied to the display device DD by using the optical pen OP, the film layer FLM may be in direct contact with a nib head part NHD.

The film layer FLM may include a protrusion part PRU formed as at least a portion of one surface (e.g., a first surface) of the film layer FLM protrudes (e.g., in the third direction DR3). In an embodiment, the first surface may be a top surface of the film layer FLM. Accordingly, the film layer FLM may have an uneven surface, such as an uneven top surface.

In some embodiments, the film layer FLM may be at least one of an anti-fingerprint (AF) film, an anti-glare (AG) film, an anti-reflection (AR) film, and a low-refraction (LR) film. For example, the film layer FLM may be an anti-glare (AG) film having a paper feeling. However, embodiments of the present disclosure are not necessarily limited thereto.

A material having elasticity such as rubber may be appropriately slid on a surface having unevenness as compared with on a surface having no unevenness. Thus, in the display device DD in accordance with an embodiment shown in FIG. 9, the optical pen OP can be appropriately slid even when the nib of the optical pen OP includes a material having elasticity such as rubber, and a soft writing feeling can be provided to the user.

Figure 10:
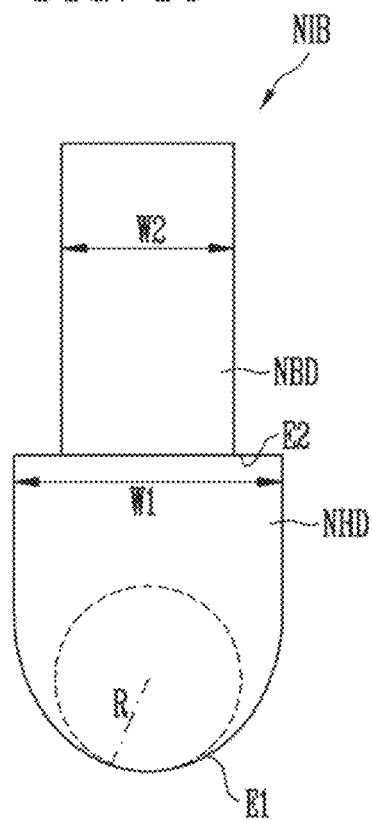
FIG. 10 is a schematic view illustrating a nib of an optical pen in accordance with an embodiment of the present disclosure.

FIG. 10 is a schematic view illustrating a nib of an optical pen in accordance with an embodiment of the present disclosure. Hereinafter, a structural feature of a nib NIB of an optical pen OP will be described with reference to FIG. 10.

The nib NIB may include a nib head part NHD and a nib body part NBD connected to the nib head part NHD.

The nib head part NHD may be in direct contact with the display device DD when an input is applied to the display device DD by the user using the optical pen OP. For example, the nib head part NHD may be a component in direct contact with the writing area WA of the display device DD when an operation for inputting a text, an image or the like is performed on the writing area WA.

The nib head part NHD may include a first end portion E1 and an opposite second end portion E2.

The first end portion E1 may be an end portion in direct contact with the display device DD when an input is applied to the display device DD by the user using the optical pen OP. The second end portion E2 may be an end portion in direct contact with the nib body part NBD.

In an embodiment, the first end portion E1 may include a curved surface. In an embodiment, the curved surface of the first end portion E1 may have a curvature radius R in a range of about 0.5 mm to about 5 mm. As the first end portion E1 includes the curved surface having the curvature radius R in a range of about 0.5 mm to about 5 mm, the nib head part NHD of the optical pen OP in accordance with this embodiment may have a relatively round shape. As the nib head part NHD has the relatively round shape, the area of the nib head part NHD in direct contact with the display device can be increased as compared with a comparative embodiment in which a device does not include a curved surface (e.g., the first end portion E1 end portion of the nib NIB is sharp). Accordingly, when the optical pen OP is in direct contact with the display device DD, the pressure applied to the display device DD can be reduced, and the pressing of the display device DD can be decreased. In addition, as compared with a comparative embodiment in which the nib head part NHD does not include a curved surface, in an embodiment in which the nib head part NHD includes the curved surface, the nib head part NHD can be more appropriately slid on the display device DD, and the optical pen OP can provide a soft writing feeling to the user.

In an embodiment, the second end portion E2 may include a relatively flat surface. The nib head part NHD may have an outer diameter which becomes wider from the second end portion E2 towards the first end portion E1. In an embodiment, the second end portion E2 may have a roughly uniform first width W1. In an embodiment, the first width W1 may be greater than or equal to about 1.0 mm. For example, in an embodiment the first width W1 may be in a range of about 1.1 mm to about 1.5 mm. In an embodiment, the first width W1 may be in a range of about 1.2 mm to about 1.4 mm. However, embodiments of the present disclosure are not necessarily limited thereto. In embodiments in which the first width W1 is excessively small (e.g., 0.9 mm or less), the nib NIB may be excessive thin. When the nib NIB is excessively thin, it may be difficult to provide a satisfactory writing feeling to the user, and the nib NIB may be structurally unstable.

The optical pen OP in accordance with this embodiment is provided such that the first width W1 of the nib NIB is in a range of about 1.1 mm to about 1.5 mm. Thus, the optical pen OP can provide a satisfactory writing feeling to the user, and have a stable structure.

The nib body part NBD may be connected to the nib head part NHD. The nib body part NBD may be connected to the second end portion E2 of the nib head part NHD.

In an embodiment, the nib body part NBD may have a second width W2. The second width W2 may be less than the first width W1. An outer diameter of the nib body part NBD may be less than an outer diameter of the second end portion E2 of the nib head part NHD.

In some embodiments, the second width W2 may be in a range of about 0.7 mm to about 1.1 mm. In an embodiment, the second width W2 may be in a range of about 0.8 mm to about 1 mm. However, embodiments of the present disclosure are not necessarily limited thereto. In an embodiment in which the second width W2 is in a range of about 0.7 mm to about 1.1 mm, the nib body part NBD can stably support the nib head part NHD.

In an embodiment, the nib head part NHD and the nib body part NBD may include the same material. In some embodiments, the nib head part NHD and the nib body part NBD may include a material having a hardness in a range of about 50 to about 90 with respect to Shore A hardness. In some embodiments, the nib head part NHD and the nib body part NBD may include a material having a hardness of about 50 with respect to the Shore A hardness to a hardness of about 40 with respect to Shore D hardness.

Therefore, the nib NIB may have a hardness in a range of about 50 to about 90 with respect to the Shore A hardness. The nib NIB may have a hardness of about 50 with respect to the Shore A hardness to a hardness of about 40 with respect to the Shore D hardness.

In some embodiments, the nib head part NHD and the nib body part NBD may include felt or synthetic fiber. For example, the synthetic fiber may include at least one material selected from the group consisting of nylon, polyester, acryl, polyurethane, polyethylene terephthalate, polyacrylonitrile, polyvinyl alcohol, polyethylene, and polypropylene. However, embodiments of the present disclosure are not necessarily limited thereto.

Since the felt or synthetic fiber has a relatively low density as compared with other materials, the nib NIB including the felt or synthetic fiber does not excessively press the display device DD. Thus, the nib NIB can press the display device DD with a strength (e.g., magnitude of pressure) similar to a strength when the nib NIB includes rubber.

In addition, the nib NIB including the felt or synthetic fiber can be softly slid on the display device DD. Accordingly, the nib NIB can provide the same writing feeling as when the nib NIB includes a material (e.g., plastic) having a relatively high hardness.

Thus, the optical pen OP in accordance with this embodiment can decrease the pressing of the display device DD while providing a satisfactory writing feeling to the user.

Figure 11:
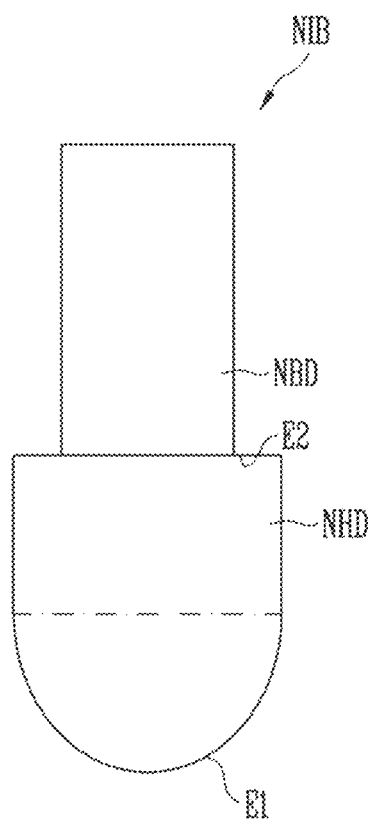
FIG. 11 is a schematic view illustrating a nib of an optical pen in accordance with an embodiment of the present disclosure.

FIG. 11 is a schematic view illustrating nibs of optical pens in accordance with embodiments of the present disclosure. A nib NIB in accordance with an embodiment shown in FIG. 11 is different from the nib NIB shown in an embodiment of FIG. 10 based on the nib head part NHD includes two or more materials. A nib NIB according to an embodiment is different from the above-described embodiments, in that the nib NIB is formed of an elastic polymer. Hereinafter, the nib NIB including two or more materials and the nib NIB that is formed of an elastic polymer will both be shown with reference to FIG. 11. In FIG. 11, portions of elements similar or identical to those described above with reference to FIG. 10 may not be repeated for economy of description.

The nib head part NHD of the optical pen OP in accordance with an embodiment of the present disclosure may include a first material at the first end portion E1, and include a second material different from the first material at the second end portion E2.

In some embodiments, the first material may include a material having a hardness in a range of about 50 to about 90 with respect to the Shore A hardness or a material having a hardness of about 50 with respect to the Shore A hardness to a hardness of about 40 with respect to the Shore D hardness. In some embodiments, the first material may include felt or synthetic fiber.

Therefore, a hardness of one area of the nib NIB may have a hardness in a range of about 50 to about 90 with respect to the Shore A hardness. The nib NIB may have a hardness of about 50 with respect to Shore A hardness to a hardness of about 40 with respect to the Shore D hardness.

In some embodiments, the second material may include a plastic or an elastic polymer. However, embodiments of the present disclosure are not necessarily limited thereto.

In an embodiment, the plastic may include at least one material selected from the group consisting of polyethylene terephthalate (PET), high density polyethylene (HDPE), low density polyethylene (LDPE), polypropylene (PP), polystyrene (PS), and polyvinyl chloride (PVC).

In an embodiment, the elastic polymer may include an elastomer including at least one of rubber, silicone, urethane, and urethane acrylate.

In the optical pen OP in accordance with an embodiment of the present disclosure, as the nib head part NHD includes felt or synthetic fiber at one end portion (e.g., the first end portion E1), the optical pen OP can provide a satisfactory writing feeling to the user, and decrease pressing (e.g., magnitude of pressure thereon) of the display device DD.

In the optical pen OP in accordance with an embodiment of the present disclosure, the nib head part NHD of the nib NIB may include an elastic polymer. The nib NIB may include an elastic polymer at the first end portion E1.

In an embodiment in which the nib NIB includes an elastic polymer at the first end portion E1, the display device of the display system IPS may include the stacked structure of the display device DD in accordance with the embodiment shown in FIG. 9.

As the display device DD includes the film layer FLM having unevenness at one surface in direct contact with the nib NIB, the nib NIB can be softly slid on the display device DD even when the nib NIB includes an elastic polymer such as rubber. Accordingly, the display system IPS can provide a satisfactory writing feeling to the user, and decrease pressing (e.g., magnitude of pressure thereon) of the display device DD.

Figure 12:
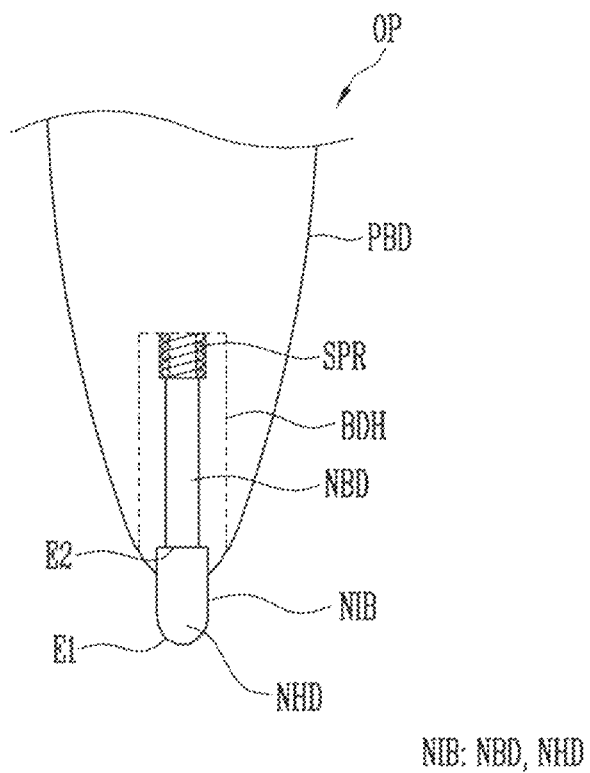
FIG. 12 is a schematic view illustrating a body of an optical pen in accordance with an embodiment of the present disclosure.

FIG. 12 is a schematic view illustrating a body of an optical pen in accordance with an embodiment of the present disclosure. The optical pen OP in accordance with an embodiment shown in FIG. 12 is different from the above-described embodiments, in that a spring SPR is included in the pen body PBD, and the nib head part NHD may include plastic at the first end portion E1. Hereinafter, the optical pen OP in accordance with an embodiment of the disclosure will be described with reference to FIG. 12. In FIG. 12, portions of elements that are similar or identical to those described above may not be repeated for economy of description.

The optical pen OP may further include the spring SPR. The spring SPR may be a member which absorbs pressure. The spring SPR may be inserted into the hole BDH formed in the pen body PBD to be fixed.

In an embodiment, the spring SPR may be in direct contact with the nib body part NBD. As the spring SPR is in direct contact with the nib body part NBD, the spring SPR may absorb pressure applied to the nib NIB when the nib NIB is pressed on the display device DD. In some embodiments, the spring SPR may be at least one of a compression spring, a tension spring, and a leaf spring. However, embodiments of the present disclosure are not necessarily limited thereto. In an embodiment, the spring SPR may be compressed when a pressure greater than or equal to about 100 gf is applied. However, embodiments of the present disclosure are not necessarily limited thereto.

In an embodiment, the nib head part NHD may include at least one of felt, synthetic fiber, and plastic. In some embodiments, the nib head part NHD may include plastic at the first end portion E1.

As the optical pen OP further includes the spring SPR even when the nib head part NHD includes the plastic at the first end portion E1, the spring SPR can absorb pressure generated when the optical pen OP is in direct contact with the display device DD, and no pressing (e.g., excessive pressure thereon) of the display device DD occurs.

Thus, in the optical pen OP in accordance with an embodiment shown in FIG. 12, even when the nib head part NHD includes plastic having a high hardness as compared with felt and synthetic fiber, the pressing of the display device DD in direct contact of the optical pen OP with the display device DD can be decreased. As the nib head part NHD includes the plastic at the first end portion E1, the optical pen OP can provide a satisfactory writing feeling to the user.

In accordance with embodiments of the present disclosure, an optical pen and a display system including an optical interface are provided which allow a display device to avoid being excessively pressed when the display device is in direct contact with the optical pen, and can provide a soft writing feeling to a user.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure.

What is claimed is:

1. A display system including an optical interface, the display system comprising:
    an optical pen outputting infrared light; and
    a display device acquiring information on a user input based on the infrared light provided by the optical pen,
    wherein the display device includes:
    a panel layer; and
    a code layer disposed on the panel layer, the code layer including an optical pattern absorbing at least a portion of the infrared light provided by the optical pen,
    wherein the optical pen includes:
    a pen body; and
    a nib disposed in the pen body,
    wherein the nib includes:
    a nib head part including a first end portion and an opposite second end portion; and
    a nib body part connected to the nib head part,
    wherein the first end portion forms a curved surface, and
    wherein a hardness of the nib is in a range of about 50 to about 90 with respect to Shore A hardness.

2. The display system of claim 1, wherein the nib head part includes felt or synthetic fiber.

3. The display system of claim 2, wherein the curved surface of the first end portion has a curvature radius in a range of about 0.5 mm to about 5 mm.

4. The display system of claim 1, wherein:
    the display device further includes at least one of a polarizing layer disposed on the panel layer and a window layer disposed on the code layer,
    wherein the window layer has a thickness in a range of about 20 µm to about 100 µm.

5. The display system of claim 1, wherein the display device is a foldable, slidable or rollable display device.

6. The display system of claim 5, wherein:
    the nib head part has a first width in a range of about 1.1 mm to about 1.5 mm; and
    the nib body part has a second width in a range of about 0.7 mm to about 1.1 mm.

7. The display system of claim 1, wherein the nib head part includes an elastic polymer including at least one elastomer selected from the group consisting of rubber, silicone, urethane, and urethane acrylate.

8. The display system of claim 7, wherein:
the display device further includes a film layer disposed on the code layer,
wherein the film layer includes a protrusion part protruding from at least a portion of a first surface of the film layer.

9. The display system of claim 8, wherein the curved surface of the first end portion has a curvature radius in a range of about 0.5 mm to about 5 mm.

10. The display system of claim 1, wherein the nib head part includes plastic including at least one material selected from the group consisting of polyethylene terephthalate, high density polyethylene, low density polyethylene, polypropylene, polystyrene, and polyvinyl chloride.

11. The display system of claim 10, wherein:
the optical pen further includes a spring in contact with the nib body part disposed in the pen body,
wherein the spring is at least one of a compression spring, a tension spring, and a leaf spring.

12. The display system of claim 11, wherein the curved surface of the first end portion has a curvature radius in a range of about 0.5 mm to about 5 mm.

13. An optical pen comprising:
a pen body; and
a nib disposed in the pen body,
wherein the nib includes:
a nib head part including a first end portion and an opposite second end portion; and
a nib body part connected to the nib head part,
wherein the first end portion forms a curved surface,
wherein the second end portion has a first width and the nib body part has a second width,
wherein the nib includes felt or synthetic fabric, and
wherein a hardness of the nib is in a range of about 50 to about 90 with respect to Shore A hardness.

14. The optical pen of claim 13, wherein the curved surface of the first end portion has a curvature radius in a range of about 0.5 mm to about 5 mm.

15. The optical pen of claim 14, wherein:
the first width is in a range of about 1.1 mm to about 1.5 mm; and
the second width is less than the first width.

16. An optical pen comprising:
a pen body; and
a nib disposed in the pen body,
wherein the nib includes:
a nib head part including a first end portion and an opposite second end portion; and
a nib body part connected to the nib head part,
wherein the first end portion includes a curved surface,
wherein the nib includes a first material having a hardness in a range of about 50 with respect to Shore A hardness to a hardness of about 40 with respect to Shore D hardness at the first end portion, and
wherein the nib includes a second material different from the first material at the second end portion.

17. The optical pen of claim 16, wherein:
the first material includes felt or synthetic fiber; and
the second material includes plastic or an elastomer.

18. The optical pen of claim 17, wherein the curved surface of the first end portion has a curvature radius in a range of about 0.5 mm to about 5 mm.

19. The optical pen of claim 18, wherein:
the nib head part has a first width in a range of about 1.1 mm to about 1.5 mm; and
the nib body part has a second width that is less than the first width.

* * * * *